United States Patent

Rapp et al.

[11] Patent Number: 5,963,322
[45] Date of Patent: Oct. 5, 1999

[54] OPTICAL SPECTROMETER AND METHOD OF IMPLEMENTING OPTICAL SPECTROSCOPY

[75] Inventors: Norbert Rapp, Hagenbach; Arno Simon, Karlsruhe, both of Germany

[73] Assignee: Bruker Analytik GmbH, Rheinstetten, Germany

[21] Appl. No.: 09/027,901

[22] Filed: Feb. 23, 1998

[30] Foreign Application Priority Data

Mar. 5, 1997 [DE] Germany .................... 197 08 913

[51] Int. Cl.$^6$ ............................................... G01B 9/02
[52] U.S. Cl. ...................... 356/346; 356/358; 356/345
[58] Field of Search ................................ 356/346, 358, 356/345

[56] References Cited

U.S. PATENT DOCUMENTS 5,117,466  5/1992  Buican et al. ............................ 382/6
5,422,721  6/1995  Ryan ...................................... 356/345

FOREIGN PATENT DOCUMENTS 9201210  1/1992  WIPO .............................. G01J 3/00

OTHER PUBLICATIONS

Applied Optics, vol. 35, No. 16 (Jun. 1, 1996): James Brault New approach to high–precision Fourier transform spectrometer design pp. 2891–2896.

Werner Herres and J. Gronholz: "Datenverarbeitung in der FT–IR–Spektroskopie" in Comp. Anw. Lab., No. 5/1984, pp. 352–356, vol. 6/1984, pp. 418–425 and vol. 5/1985, pp. 230–240.

*Primary Examiner*—Robert H. Kim
*Assistant Examiner*—Andrew H. Lee
*Attorney, Agent, or Firm*—Paul Vincent

[57] ABSTRACT

An optical spectrometer (1) with an interferometer having a means for varying the optical path difference comprising a drive (8), and with a detector (6) for recording optical signals from the interferometer and converting them into electrical analog signals, wherein an analog-to-digital converter (ADC) (9) is connected to the detector (6) digitizing the electrical analog signals in a time-equidistant manner, is characterized in that the data acquisition electronics (17) are supplied by a switched power supply (14), the clock of which is derived from the same reference oscillator (16) as the clock of the signal digitization by the ADC (9). In contrast to known spectrometers with spatially equidistant sampling of the detector signal, the design of the spectrometer according to the invention is considerably cheaper and more compact with respect to its voltage supply elements. Galvanic separation of the data acquisition electronics and the electronic control unit of the linear drive is no longer required.

15 Claims, 3 Drawing Sheets

OPTICAL SPECTROMETER AND METHOD OF IMPLEMENTING OPTICAL SPECTROSCOPY

This application claims Paris Convention Priority of German patent application 197 08 913.5, the complete disclosure of which is hereby incorporated by reference.

BACKGROUND OF THE INVENTION

The invention concerns an optical spectrometer, in particular a Fourier transform (FT) spectrometer, with an interferometer having a means for varying the optical path difference comprising a drive, and with a detector for recording optical signals from the interferometer and converting them into electrical analog signals, wherein data acquisition electronics are connected to the detector, which comprise at least one analog-to-digital converter (ADC), digitizing the electrical analog signals in a time-equidistant manner, and, if necessary, further signal processing elements.

A spectrometer of this type is known from the article entitled "New approach to high-precision Fourier transform spectrometer design" by J. W. Brault in the journal Appl. Optics, Vol. 35, No. 16, pages 2891–2896, Jun. 1, 1996.

Optical spectroscopy, in particular infrared Fourier transform (IR-FT) spectroscopy is one of the most effective tools available to the analytical chemist in research, application and process control. Common methods of recording such optical spectra are described in all details e.g. in a series of articles by J. Gronholz and W. Herres with the title "Datenverarbeitung in der FT-IR Spektronskopie" (data processing in FT-IR spectroscopy) in the journal Comp.Anw.Lab., Edition 5/1984, pages 352–356, Edition 6/1984, pages 418–425 and Edition 5/1985, pages 230–240. In this connection, zero crossings of a reference interferogram, which is recorded e.g. by an HeNe laser, are measured in their temporal sequence and the simultaneously recorded effective interferogram is digitized at these zeroes.

The hitherto common method, applied in optical FT spectrometers from the infrared to the ultraviolet range, of sampling the detector signal in a spatially equidistant manner with reference to the position of the interferometer mirror (in a Michelson interferometer), however, does not allow exact compensation of the amplitude and phase responses of the detector, since the actual speed of the interferometer mirror is not known. For this reason, it is not possible to compensate differences and distortions of the transit time between effective signal and reference signal due to an apparatus function. Any speed variation of the mirror drive will therefore cause side-band modulation in the spectral lines. For this reason, operational methods for spectrometers of this type are not suited for systems with heavy mechanical disturbances, e.g. in the vicinity of vibration generating machines or for spectrometers which are mounted e.g. on movable vehicles.

The initially cited publication by J. W. Brault describes, in contrast thereto, a method of compensating the amplitude and phase responses which can be used with particular efficiency in a system with time-equidistant sampling of the optical signal. By means of "pre" digitization of the effective signal by means of the ADC with fixed time periods, the apparatus function of the detector and the further signal processing elements can essentially be removed from the spectra by deconvolution.

The time-equidistant sampling enables determination of the development with time of the detector signal. A digital filter (called compensation filter) can be applied to said sampled signal, which filter comprises the reciprocal complex frequency response (consisting of amplitude and phase responses) of the detector and the further signal processing elements. At the output of this filter, values are obtained which correspond to the optical signal at the input of the detector multiplied by its spectral responsivity delayed merely by a constant time period. The signal is independent of the driving speed of the interferometer mirror.

In order to obtain from the detector signal an interferogram which is independent of the speed variations of the movable mirror in the interferometer, spatially equidistant sampling of the IR detector signal is necessary. In order to convert the signal, which was sampled at equal time intervals, into a spatially equidistantly sampled signal, signal values are calculated by means of a digital filter with constant delay (called an interpolation filter) at those points in time, at which the optical path difference in the interferometer achieves certain values, i.e. values, at which the movable mirror/s in the interferometer is/are at certain locations. Since the compensation filter and the interpolation filter operate in the time domain in each case, they can be applied one after the other.

Since the two filters are applied one after the other and both are time domain filters, they can be combined in one filter by convolving their filter coefficients. This reduces the requirements concerning the storage need and the speed of the digital filter processor.

Finally, a further digital filter (called spatial frequency filter) can be applied to the resulting values of the combined compensation and interpolation filter, which carries out reduction of the data to the desired spectral range. This filter cannot be linked with the combined filter since it has to be applied to spatially equidistant sampling values; however, it can be carried out by the same processor.

The time-equidistant sampling method allows simultaneous recording of the variations in time and the absolute positions of the zero crossings of the reference signal. After corresponding conversion of the ADC signals to spatially equidistant positions of the mirror (interpolation filter), a signal quality can be achieved which is at least equal to the one of the above-described spatially equidistant sampling method, wherein, however, the experimenter is given considerably more flexibility since not only the zero crossings but any intermediate values can be used for digitization. A further, very important advantage of the method according to Brault consists in the possible correction of the apparatus function by the above-described compensation filter which corresponds to deconvolution of the transfer function of the detector from the spectra.

In known spectrometers, the detector signal of which is not sampled in a time-equidistant manner but in a spatially equidistant manner, the expense connected with the apparatus is considerably higher. The sampling signal does not have a constant frequency but depends on the speed of the drive. For this reason, it is not possible to synchronize a switched power supply by means of the sampling signal. In order to achieve the required measurement accuracy, which should be larger than 16 bit, the product of ripple and interference suppression of the supply voltage of the data acquisition electronics has to be less than $1/(2^{16})$ of the supply voltage range. It is not possible to achieve such accuracy with the currently known switched power supplies. For this reason, in spectrometers with spatially equidistant signal sampling, the data recording part has to be supplied from a separate linear power supply and furthermore, has to be galvanically separated from the switched supply of the electronic control unit of the drive. The required linear power supply, the use of separate voltage supplies and the galvanic separation of the data acquisition electronics and the electronic control unit of the linear drive, however, cause high expenses.

For this reason, it is an object of the present invention to provide an optical spectrometer comprising the initially described features, on which a method according to the Brault proposition can be carried out, wherein, in contrast to known spectrometers with spatially equidistant sampling of the detector signal, the design of the spectrometer is considerably cheaper and more compact with respect to its voltage supply means, and wherein galvanic separation of the data acquisition electronics and the electronic control unit of the drive is not required.

SUMMARY OF THE INVENTION

According to the invention, this objective is achieved in connection with the initially described method features in that the data acquisition electronics are supplied from a switched power supply, the clock of which is derived from the same reference oscillator as the clock for the signal digitization by the ADC.

By means of the time-equidistant sampling of the detector signal, it is possible to derive the power for the spectrometer electronics from a switched power supply, the clock frequency of which is rigidly connected with the clock frequency of the sampling of the detector signal. Owing to the phase locked coupling of the ripple to the ADC clock, the remaining ripple of the output voltage of the switched power supply, which is synchronous to said clock, has no more influence on the accuracy of the sampling values. The disturbances generated by the power supply act only as an offset and can therefore be neglected. In this manner, the interference peaks can be suppressed in a very effective and technically simple manner. A further advantage of the solution according to the invention results from the fact that the switched power supplies which can be used are markedly cheaper and more compact than comparable linear power supplies in known spectrometers and, additionally produce considerably less waste heat since they operate with higher efficiency.

One embodiment of the optical spectrometer according to the invention is particularly preferred in which the switched power supply for the supply of the data acquisition electronics supplies simultaneously also the drive with current resp. voltage. For this reason, only one single power supply is required for supplying a voltage to the entire spectrometer which further reduces the costs for producing the spectrometer.

In a further development of this embodiment, a phase shifter may be provided between the reference oscillator and the switched power supply for shifting the phase of the clock signal. In this manner, any desired phase relationship between the clock signal of the ADC and the remaining ripple of the output voltage of the power supply can be set.

One embodiment is also preferred in which the switched power supply and/or the ADC are devices of a type which can be used in audio technology. It is preferred to use a CRYSTAL CS5390 as ADC and a KNIEL DCM 1606/27/PFS as switched power supply.

Devices of this kind which can be used in audio technology are available on the market at extremely low prices due to mass production.

Particularly preferred is one embodiment of the inventive optical spectrometer in which the switched power supply can be operated by means of a battery. Since the compact switched power supplies exhibit a considerably higher efficiency and less waste heat as compared to linear power supplies, power supplies switched in this manner do not depend on mains supply owing to their extremely low energy consumption, but can be operated over a longer period of time independently of the mains by means of common batteries.

One further development of this embodiment is very advantageous in which the optical spectrometer can be used in a mobile manner at changing places, e.g. in the protection of the environment for controlling possibly detrimental emissions. In this connection, the spectrometer according to the invention can be mounted e.g. also on vehicles since the utilized operational method with time-equidistant signal sampling is relatively insensitive to coarse mechanical disturbances, in particular vibrations of the spectrometer.

The ADC of the optical spectrometer according to the invention can operate at a clock frequency of a range of between 100 Hz and 500 KHz, preferably at a clock frequency of 48.8 KHz.

The switched power supply of the optical spectrometer according to the invention operates at a clock frequency in the area of 20 KHz to 1 MHz, preferentially at a clock frequency of 97.6 KHz.

By interconnecting a rigid frequency converter, the cheap ADCs and the above-mentioned switched power supplies, which are also available at low cost, can be adjusted to one another in an optimum manner.

A particularly preferred embodiment of the optical spectrometer according to the invention is characterized in that a digital signal processor (DSP) is connected to the ADC, with a digital compensation filter implemented thereon which comprises the reciprocal complex frequency response of the detector and possible further signal processing elements. In this manner, it is possible to essentially deconvolute the apparatus function of detector and signal processing elements from the spectra.

The scope of the invention also includes a method of optical spectroscopy in which, in an interferometer, an optical path difference of approximately time-constant rate is varied and a measuring signal for generating an interferogram is detected from the interferometer by means of the detector and is digitized in the data acquisition electronics. The method according to the invention is characterized in that the data acquisition electronics are supplied with electricity from a switched power supply, the clock of which correlates with, preferably is synchronized with the clock of the digitization of the optical signal. In this manner, it is possible to achieve the above-described advantages of the apparatus when constructing the spectrometer.

One variant of the method according to the invention is exceptionally preferred in which a digital compensation filter is applied to the detected optical signal, which compensates the complex frequency response consisting of amplitude and phase responses of the detector and of all further signal processing elements.

The method according to the invention is designed to be used in FT spectrometers, in particular in the IR domain. The spatially equidistant sampling of the detector signal, which has been and still is common, does not allow exact compensation of the amplitude and phase responses of the detector such that with each speed variation of the mirror drive in the interferometer, side-band modulation is generated in the spectral lines. The method according to the invention provides for particularly efficient compensation of the amplitude and phase responses on the basis of time-equidistant sampling of the optical signal. To render utilization of this compensation filter possible, it has to be determined at least once for each detector to be used in the FT spectrometer and for any possibly existing further signal processing elements.

One interferogram is recorded in the forward and in the backward motion of the interferometer mirror, in each case. Fourier transformation is carried out according to amplitude and phase. The phase spectra of the forward and backward motions are added and divided by two (formation of the mean value). The optical phase generated by optical influences reverses and is thus cancelled out. Accordingly, the mere electrical phase response of the detector including the further signal processing elements is detected while the optical characteristics are eliminated.

Then, a mathematical model of the transfer function of the signal processing elements including detector is set up on the basis of their electrical characteristics, wherein the free parameters of the transfer function, i.e. the characteristic frequencies, are determined by a fit method applied to the measured phase response. The transfer function determined in this manner which is, as a rule, analog, is transferred to the discrete Z domain and finally the compensation filter is determined as the inverse of the discrete transfer function.

Finally, a further, particularly advantageous variant of the method consists in that the implementation of the compensation filter and of possible further filters, e.g. an interpolation filter and/or a spatial frequency filter is carried out on a digital signal processor (DSP) and that the output data is transferred via digital interfaces to a computer for further processing. The signals at the output of the DSP are compatible with the signals of common devices having spatially equidistant sampling such that already existing conventional evaluation software can be used without any problems. Furthermore, the calculation of the filter/s does not require any approximation as it would be necessary e.g. for the operation on a personal computer for reducing the calculation time.

Finally, one variant of the method is particularly preferred in which the variation of the optical path difference is carried out by regulating a drive with a clock which is synchronous to the sampling clock.

Further advantages of the invention can be gathered from the description and the drawing. According to the invention, the features described above and below may be used either individually or collectively in arbitrary combinations. The embodiments shown and described are not to be understood as exhaustive enumeration but rather have exemplary character for describing the invention.

The invention is shown in the drawing and is explained in more detail by means of embodiments. In the drawing:

DESCRIPTION OF THE PREFERRED EMBODIMENT

Figure 1:
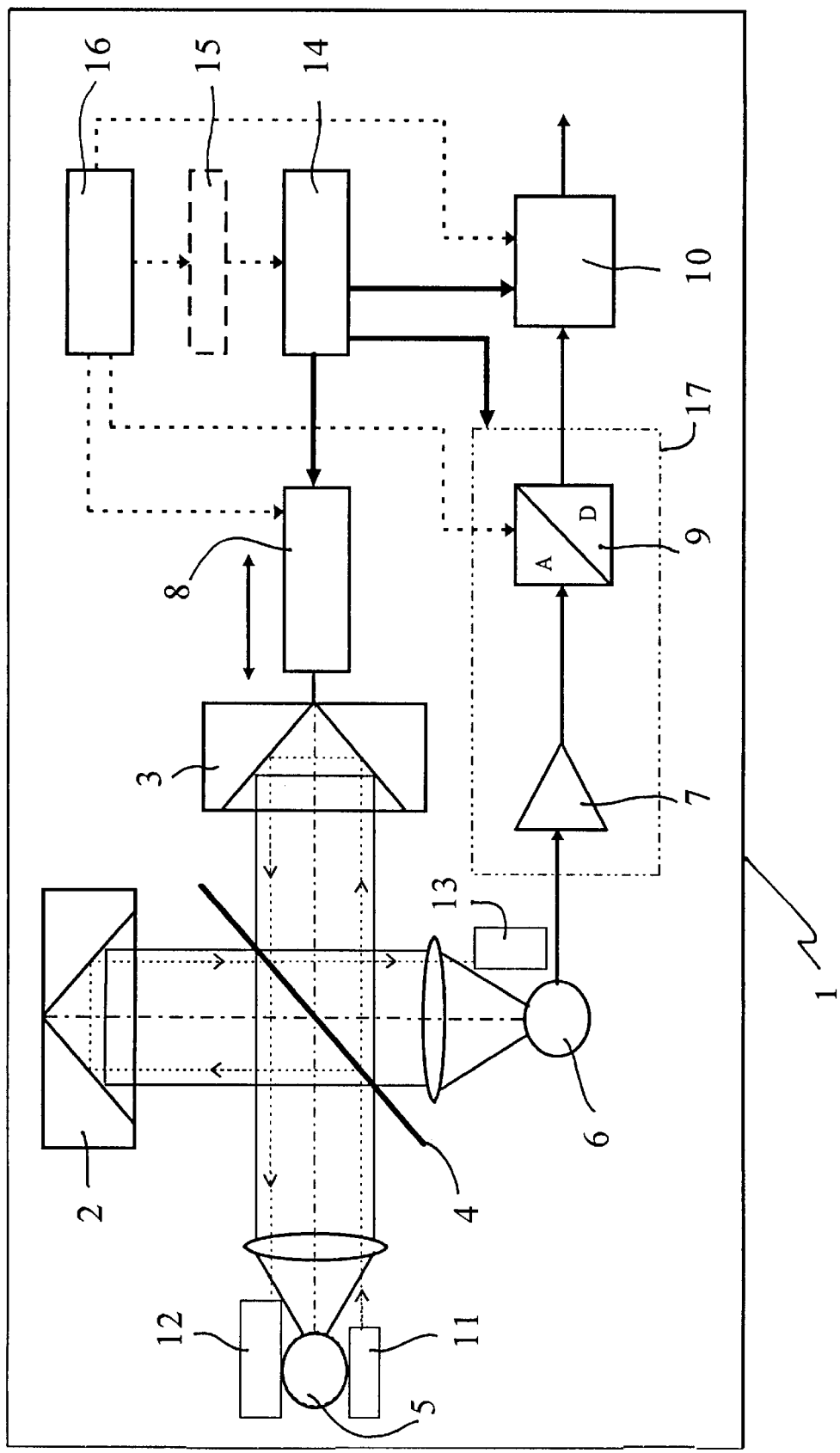
FIG. 1 shows a schematic representation of a Fourier transform spectrometer according to the invention with a Michelson interferometer.

The FT spectrometer 1 represented in FIG. 1 in a highly abstracted functional diagram contains a Michelson interferometer having a fixed mirror 2 and a mirror 3 which is movable in the direction of the double arrow by means of a drive 8, which are supplied with light, in each case, via a beam splitter 4 from an optical source 5, the light being detected at a detector 6 after its passage through the interferometer.

A laser 11, as a rule, an HeNe laser supplies light to the interferometer for recording a reference interferogram. A first laser detector 12 records the reference light reflected from the interferometer, while a second laser detector 13 can detect the reference light emanating from the interferometer in the direction of the detector 6.

The optical signals detected in the detector 6 are supplied to further signal processing elements 7, which may comprise e.g. an amplifier, at the output of which an analog effective interferogram can be monitored. Same is transferred to an analog-to-digital converter (ADC) 9 which is clocked at a fixed digitizing frequency from a reference oscillator 16. In a fixed frequency relationship thereto, the latter clocks simultaneously the switched power supply 14 which provides a voltage to the data acquisition electronics 17 and simultaneously also to the drive 8, wherein the clock phase can be set arbitrarily by interconnecting a phase shifter 15.

Finally, the corresponding output signal from the ADC 9 is transmitted to a compensation filter which may be provided in particular in the form of suitable software. The possibility of time-equidistant interferogram sampling shown by J. W. Brault suffers from side-band modulation distortions in the spectrum if the mirror speed of the drive 8 is not constant, as already mentioned above. In practice, external interferences and thus speed variations always have to be taken into account. Side-band modulations can be avoided if the complex frequency response of the detector 6 and of the further signal processing elements 7 is neutralized by a suitable compensation filter.

In general, it is advisable to carry out implementation of the compensation filter and of the interpolation filter, which is necessary for conversion to spatially equidistant interferogram points, on a digital signal processor 10. Owing to the high calculation performance with respect to filter algorithms, data processing can be effected in real time. The filtered output interferograms can be further processed by means of conventional software.

Figure 2A:
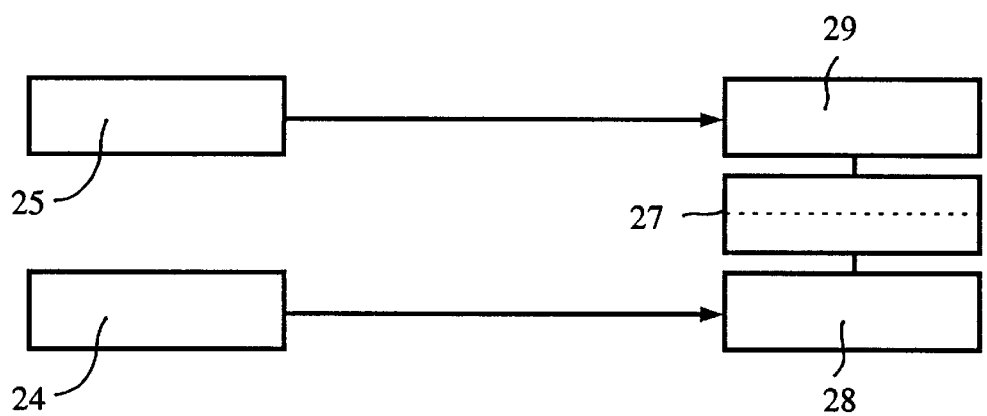
FIG. 2a shows a diagram of the voltage supply in an optical spectrometer with spatially equidistant signal sampling according to the prior art.

FIG. 2a shows schematically the voltage supply in a common optical spectrometer with spatially equidistant signal sampling according to prior art.

In the conventional method, the IR detector signal is sampled in a spatially equidistant manner with the consequence that the sampling signal does not have a constant frequency but depends on the speed of the drive 28. For this reason, it is not possible to synchronize a switched power supply with the sampling signal. In order to obtain the required measurement accuracy of >16 bit, the product of supply voltage ripple and supply voltage interference suppression of the data acquisition electronics 29 has to be less than $\frac{1}{2}^{12}$ of the supply voltage range. Accuracy of this kind cannot be achieved with switched power supplies. For this reason, the data recording part has to be supplied with a separate linear power supply 25 and, via a separating means 27, has to be galvanically separated from the switched supply of the electronic control unit of the drive 28 derived from a switched power supply 24. The use of separate voltage supply and galvanic separation causes high costs.

Figure 2B:
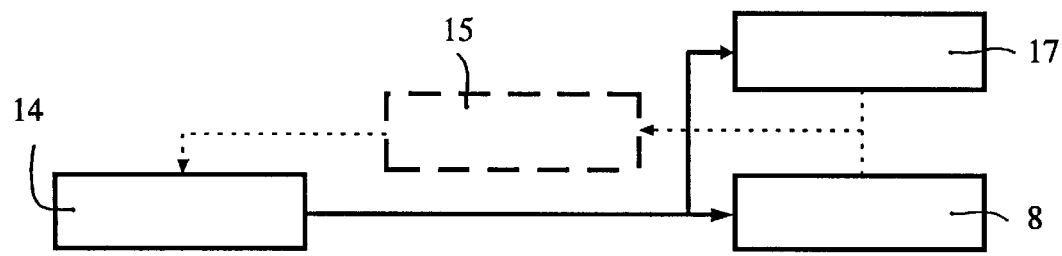
FIG. 2b shows a diagram of the voltage supply of the optical spectrometer according to the invention with time-equidistant signal sampling.

In contrast thereto, FIG. 2b shows schematically the voltage supply of the optical spectrometer 1 according to the invention with time-equidistant signal sampling. The new method no longer uses spatially-equidistant sampling but sampling with a constant sampling clock. Thereafter, interpolation to the desired spatially equidistant sampling points by means of a processor is carried out. Also the control of the drive 8 can be effected optionally with said sampling clock or a clock derived therefrom which is synchronous to the sampling clock. Now, it is also possible to additionally synchronize the switched power supply 14 with a clock derived from the sampling clock which is phase locked with respect to the sampling clock. In this connection, the frequency of the synchronization clock for the power supply 14 may be a whole fraction of the sampling clock and its phase may additionally be shifted with respect to the sampling clock.

Figure 3:
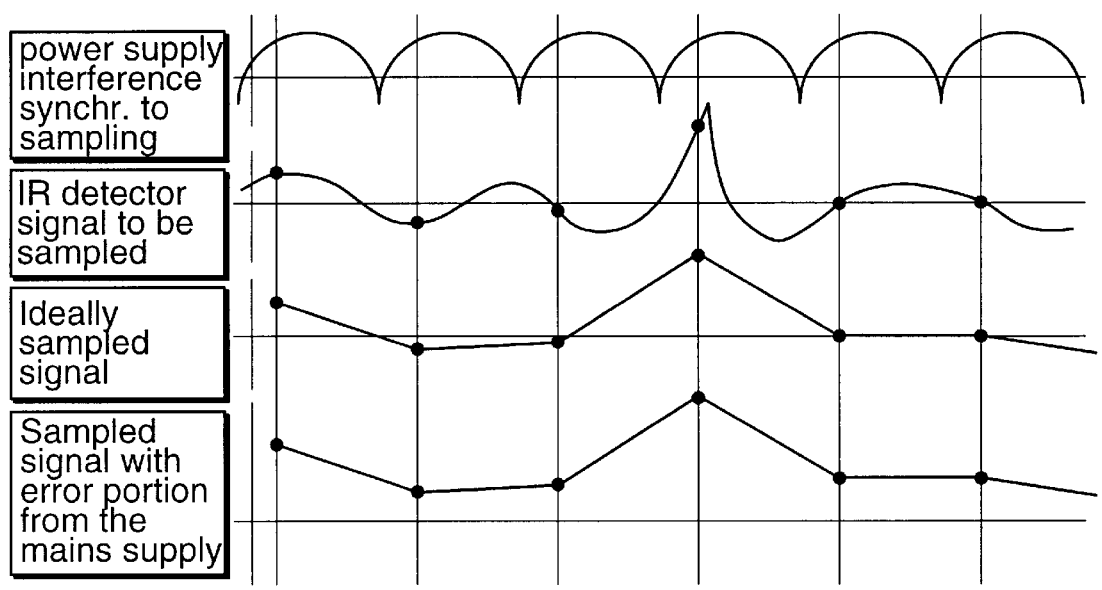
FIG. 3 shows a schematic representation of the signals in the optical spectrometer according to the invention.

Through synchronization of the power supply clock with the sampling clock, the disturbances on the voltage supply synchronous to the power supply clock, which constitute the major part of the overall interference on the supply voltage, appear as a DC offset in the sampled detector signal. This is made clear in the schematic representation of FIG. 3:

The first signal shows the power supply interference, a typical ripple signal which is synchronous to the sampling times which are marked by the vertical lines. The second signal shows the IR signal to be sampled (only in a stylized manner).

Assuming that the power supply interference does not have any effect on the conversion of data (the ideal case), the third signal would result which shows the sampled IR signal. If the power supply interference was by 100% superposed on the IR signal, the fourth signal would result.

As can be seen, the ideal third and the fourth signal, which represents the least favourable possible case, differ merely in an offset. Since the DC offset of the IR signal is not relevant for the spectral analysis (it is even eliminated by calculation for FFT), the power supply interference has no effect on the result of the measurement of the spectrometer as long as it is only synchronous to the sampling clock.

A further advantage consists in that the regulation of the drive 8 and the data recording part (ADC 9) can be operated with the same power supply 14 which is moreover a cost-favourable compact switched power supply with little power loss. Galvanic separation of the data acquisition electronics and the electronic scanning unit may also be omitted.

We claim:

1. Fourier transform optical spectrometer comprising:
   an interferometer having drive means for varying an optical path difference;
   a detector to record optical signals from said interferometer and to convert said optical signals into analog electrical signals;
   data acquisition electronics having an analog to digital converter to digitize said analog electrical signals at equidistant time intervals;
   a switched power supply connected to said data acquisition electronics;
   oscillator means connected to said acquisition electronics and to said switched power supply to synchronously time digitizing of said analog signals with switching of said power supply.

2. The spectrometer of claim 1, wherein said switched power supply supplies power to said drive means.

3. The spectrometer of claim 2, further comprising a phase shifter connected between said oscillator means and said switched power supply for shifting an oscillator means phase.

4. The spectrometer of claim 1, wherein said switched power supply is an audio technology device.

5. The spectrometer of claim 1, wherein said analog to digital converter is an audio technology device.

6. The spectrometer of claim 1, wherein said switched power supply is battery operated.

7. The spectrometer of claim 6, wherein said spectrometer is mobile.

8. The spectrometer of claim 1, wherein said analog to digital converter operates at a clock frequency between 100 Hz and 500 kHz.

9. The spectrometer of claim 8, wherein said analog to digital converter operates at a clock frequency of 48.8 kHz.

10. The spectrometer of claim 1, wherein said switched power supply operates at a clock frequency between 10 kHz and 1 MHz.

11. The spectrometer of claim 10, wherein said switched power supply operates at a clock frequency of 97.6 kHz.

12. The spectrometer of claim 1, further comprising a digital signal processor downstream of said analog to digital converter, said processor having a digital compensation filter having a complex frequency response to compensate for a response of said detector.

13. A method of Fourier transform optical spectrometry comprising the steps of:
    varying an optical path difference in an interferometer;
    detecting an optical signal from said interferometer to generate an interferogram;
    powering an analog to digital converter with a switched power supply;
    digitizing said detected optical signal in said analog to digital converter; and
    correlating a timing of a switched power supply with a clock of said analog to digital converter.

14. The method of claim 13, further comprising applying a digital compensation filter to said detected optical signal to compensate for a complex frequency amplitude and phase response of said detector.

15. The method of claim 13, wherein said varying of said optical path difference is effected by a drive means having a timing clock synchronous with a sampling clock of said analog to digital converter.

* * * * *